(12) United States Patent
Mazumder

(10) Patent No.: US 7,217,378 B2
(45) Date of Patent: May 15, 2007

(54) SIMPLE AND EFFICIENT PROCESS FOR THE PREPARATION OF PENCIL LEAD FROM SPENT POT-LINERS

(75) Inventor: Bimanranjan Mazumder, Orissa (IN)

(73) Assignee: Council of Scientific & Industrial Research, New Delhi (IN)

( * ) Notice: Subject to any disclaimer, the term of this patent is extended or adjusted under 35 U.S.C. 154(b) by 354 days.

(21) Appl. No.: 10/659,692

(22) Filed: Sep. 10, 2003

(65) Prior Publication Data

US 2005/0053410 A1    Mar. 10, 2005

(51) Int. Cl.
*C01B 31/02* (2006.01)
*C09D 13/00* (2006.01)
*C01B 31/00* (2006.01)

(52) U.S. Cl. ...................... 264/29.6; 401/49
(58) Field of Classification Search ............... 264/29.6; 401/49
See application file for complete search history.

(56) References Cited

U.S. PATENT DOCUMENTS

| | | | | |
|---|---|---|---|---|
| 1,137,373 A | * | 4/1915 | Alysworth | 252/511 |
| 4,091,083 A | * | 5/1978 | Hirschvogel et al. | 423/415.1 |
| 5,118,345 A | * | 6/1992 | Handl | 106/31.11 |
| 5,164,174 A | * | 11/1992 | Banker et al. | 588/316 |
| 5,346,930 A | * | 9/1994 | Maine et al. | 523/164 |
| 5,496,392 A | * | 3/1996 | Sims et al. | 75/414 |

FOREIGN PATENT DOCUMENTS

| | | |
|---|---|---|
| JP | 57083570 | 5/1982 |
| JP | 61252278 | 11/1986 |
| JP | 3139578 | 6/1991 |
| JP | 4252281 | 8/1992 |
| JP | 11286643 | 10/1999 |

* cited by examiner

*Primary Examiner*—Christina Johnson
*Assistant Examiner*—Patrick Butler
(74) *Attorney, Agent, or Firm*—Schwegman, Lundberg, Woessner and Kluth P.A.

(57) ABSTRACT

The present invention relates to a simple and efficient process for the preparation of pencil lead from the spent or waste pot liners of aluminum industries, said process comprising steps of crushing the liners into small sizes, adding chromic acid to the crushed liners, washing the reacted product with distilled water, thermally shock-treating the dried mass to obtain a fine flowing graphite powder, mixing the powder with binder(s), moistening the mixture with requisite amount of water to form a stiff dough, extruding the dough under pressure to obtain product in the form of a discs, heating the dried discs in an inert/reducing atmosphere in a furnace at temperature ranging between 400–1200° C. for time duration ranging between 1 to 6 hours, and obtaining the pencil lead.

13 Claims, No Drawings

ND EFFICIENT PROCESS FOR
SIMPLE AND EFFICIENT PROCESS FOR THE PREPARATION OF PENCIL LEAD FROM SPENT POT-LINERS

FIELD OF THE INVENTION

The present invention relates to a simple and efficient process for the preparation of pencil lead from the spent or waste pot liners of aluminum industries, said process comprising steps of crushing the liners into small sizes, adding chromic acid to the crushed liners, washing the reacted product with distilled water, thermally shock-treating the dried mass to obtain a fine flowing graphite powder, mixing the powder with binder(s), moistening the mixture with requisite amount of water to form a stiff dough, extruding the dough under pressure to obtain product in the form of a discs, heating the dried discs in an inert/reducing atmosphere in a furnace at temperature ranging between 400–1200° C. for time duration ranging between 1 to 6 hours, and obtaining the pencil lead.

BACKGROUND OF THE INVENTION

Pencil leads are essentially baked ceramic rod of clay bonded graphite. The suitability of graphite for pencil industry is judged by the dark streak it leaves on the paper by scratching. Synthetic graphite though has less ash content and very fine particle size, produces very little smear and thus, is unsuitable for pencil manufacturers. Usually pencil manufacturers prefer amorphous graphite with about 90% purity and free from gritty particles. Amorphous graphite gives better smear than the flaky graphite. Indian Standard Institute (ISI) has thus set norm for graphite suitable for pencil industry as—amorphous graphite with size –300 BS mesh and ash less than 50%. Micronised amorphous graphite accordingly is the very much sought after raw material for the manufacture of high class lead for pencils.

General procedure followed for making pencil lead for these micronised amorphous graphite involves, ball-milling or hammer-milling a water slurry containing clay and graphite, drying the slurry to required consistency and form a stiff dough in a mixer, followed by compacting it into a cylinder to form and extruding under pressure through a die. The wet strands are then dried, packed in saggers and kiln fired in a temperature range of 800–1100° C. The fired leads are then impregnated with waxes and fats or fatty-acids, or both. This latter step preclude glazing of the point of use. The quality of the lead depends on the quality of the ingredients used and the manufacturing process adopted. The degree of hardness depends on the ratio of clay to graphite. Clay percentage used varies from 20–60%. Pencils marked No. 1 (softest) lead contains about 20% clay while No. 4 (hardest) has about 60% clay. Hardness is a product requirement and not a quality factor such as the uniformity, smoothness or strength of the sharpened point. Indelible leads, on the other hand, are mixtures of graphite, methyl violet and binders such as gum-tragacanth or methyl-cellulose, with or without mineral fillers and insoluble soaps. Although above account exemplifies traditional and time tested industrially proven receipt and process for the production of pencil leads, a great variety of ingredients and processes have been reported in recent times.

OBJECTS OF THE INVENTION

The main objective of the present invention is to develop a simple process for the preparation of pencil lead.

Another main object of the present invention is to develop an economical process for the preparation of pencil lead.

Still another main object of the present invention is to develop an efficient process for the preparation of pencil lead from spent pot-liners.

Still another object of the present invention is to develop a process for the preparation of pencil lead from spent pot-liners from aluminum industries.

BRIEF SUMMARY OF THE INVENTION

The present invention relates to a simple and efficient process for the preparation of pencil lead from the spent or waste pot liners of aluminum industries, said process comprising steps of crushing the liners into small sizes, adding chromic acid to the crushed liners, washing the reacted product with distilled water, thermally shock-treating the dried mass to obtain a fine flowing graphite powder, mixing the powder with binder(s), moistening the mixture with requisite amount of water to form a stiff dough, extruding the dough under pressure to obtain product in the form of a discs, heating the dried discs in an inert/reducing atmosphere in a furnace at temperature ranging between 400–1200° C. for time duration ranging between 1 to 6 hours, and obtaining the pencil lead.

DETAILED DESCRIPTION OF THE INVENTION

Accordingly, the present invention relates to a simple and efficient process for the preparation of pencil lead from the spent or waste pot liners of aluminum industries, said process comprising steps of crushing the liners into small sizes, adding chromic acid to the crushed liners, washing the reacted product with distilled water, thermally shock-treating the dried mass to obtain a fine flowing graphite powder, mixing the powder with binder(s), moistening the mixture with requisite amount of water to form a stiff dough, extruding the dough under pressure to obtain product in the form of a discs, heating the dried discs in an inert/reducing atmosphere in a furnace at temperature ranging between 400–1200° C. for time duration ranging between 1 to 6 hours, and obtaining the pencil lead.

In the main embodiment of the present invention, wherein a simple and efficient process for the preparation of pencil lead from the spent or waste pot liners of aluminum industries, said process comprising steps of:
  collecting spent or waste spent pot liners,
  crushing the liners into various sizes ranging between ½ inch to –125 micron,
  adding chromic acid to the crushed liners for time duration ranging between 20–40 minutes at temperature ranging between 130–140° C. to obtain the reacted product,
  washing the reacted product with distilled water multiple times till the filtrated solid mass is neutral,
  drying the neutral solid mass at temperature ranging between 80–120° C. for about 1 hour,
  thermally shock-treating the dried mass for about 1–3 minutes in pre-heated furnace kept at temperature ranging between 900–980° C. to obtain a fine flowing graphite powder,
  mixing the powder with binder(s),
  moistening the mixture with requisite amount of water to form a stiff dough,
  extruding the dough under pressure to obtain product in the form of a discs, drying the discs to the moisture content of less than 10%,
heating the dried discs in an inert/reducing atmosphere in a furnace at temperature ranging between 400–1200° C. for time duration ranging between 1 to 6 hours,
cooling the heated discs to room temperature in about 20–50 hours, and
obtaining the pencil lead.

In still another embodiment of the present invention, wherein the spent or waste pot liners are cathode blocks.

In still another embodiment of the present invention, wherein the binders are selected from a group comprising bentonite clay, china clay, local plastic clay with added phosphoric acid, and kaoline clay.

In still another embodiment of the present invention, wherein the ratio of graphite powder to binder is ranging between 4:1 to 2:3.

In still another embodiment of the present invention, wherein the ratio of binders is ranging between 3:0.5 to 1:1.

In still another embodiment of the present invention, wherein the chromic acid is added dropwise.

In still another embodiment of the present invention, wherein the chromic acid is added under constant stirring.

In still another embodiment of the present invention, wherein the graphite powder is of crystalline size of about 2θ micrometers.

In still another embodiment of the present invention, wherein the graphite powder has ash content of about 15%.

In still another embodiment of the present invention, wherein the pressure is ranging between 50–200 Kg/cm².

In still another embodiment of the present invention, wherein the disc is dried under the shade.

In still another embodiment of the present invention, wherein the room temperature is ranging between 24 to 30° C.

In another main embodiment of the present invention, wherein the pencil lead obtained from the spent or waste pot liners by the aforementioned process.

A simple process for removing contaminants from spent pot liners of aluminum industries disclosed whereby simultaneously graphite value of the spent pot liners are recovered and converted to an useful industrial product like pencil lead. Various binders like bentonite clay, china clay, local plastic clay, etc., are used in various proportions to generate a wide range of transverse breaking strength and quality of these pencil leads.

The present invention relates to a process for the preparation of pencil lead from spent pot liners of aluminum industries.

Accordingly, the present invention provides a process for safe disposal of aluminum industry wastes (spent and contaminated pot liners) and extract its graphite value in micronised form to produce pencil leads using various types of binders.

Accordingly, spent/waste cathode blocks (spent pot liners) were collected from NALCO, Angul (Orissa) aluminum extraction plant, and ground to various sizes from ½ inch to −125 micron size. The crushed material was then taken into a 500 ml flask provided with a stirrer and a thermometer. The assembly was placed inside a small fume cupboard, exhaust of which passes through a dilute sodium-hydroxide solution bubbler. Small amount of chromic acid was added to the said crushed sample dropwise and stirring while cold water was passed around the flask to keep it under 140° C. The chromic acid solution was freshly prepared by adding requisite amount of concentrated (98%) commercial grade sulfuric acid with sodium dichromate powder. The reaction of chromic acid with crushed sample was vigorous and reaction temperature needs to be controlled between 130–140° C. The reaction is over in about 20 minutes time after which sufficient distilled water was added to the sample, stirred and allowed to stand for settling. The supernatant liquid was filtered through a gouche funnel. The solid mass was again washed with distilled water and filtered. This process of washing was continued till the filtrate is neutral. The solid mass thus collected in the sintered funnel was then dried in an oven at 90–110° C. for 1 hour. The dried powder was then thermally shock-treated in a pre-heated furnace kept at about 950° C. for about 2 minutes.

The said treatment generates a fine free flowing graphite powder with average crystallite size of about 2θ micro-meter as determined by Malvern particle size analyzer. It was observed that the size of the said graphite crystallite remains the same irrespective of the size of the starting carbon material although the time of completion of acid reaction varies widely. The product has ash content of about 15%.

Graphite powder (ash content about 15%) thus obtained was then mixed with various binders like bentonite clay, kaoline clay, local plastic clay (Chandikhol, Orissa, washed), local plastic clay with added phosphoric-acid, etc., in proportions of 20–60% and formed into a stiff dough by moistening with requisite water, and extruding at a pressure of 50–200 kg/cm². The product in the form of discs were allowed to dry in a shade until moisture is below 10%. After shade drying it was fired under inert atmosphere in a furnace in the temperature range 1000–1200° C. for 6 hours. After firing it was cooled slowly inside the furnace to room temperature in about 24 hours time. The product was then impregnated with wax to produce the said pencil leads.

The pencil lead obtained by the aforementioned process can be used to prepare pencil leads of various shapes as per the requirement. It could be in the forms like rod shaped, broad shaped, etc.

The following examples are cited by way of illustration and therefore, should not be constructed to limit scope of the present invention:

EXAMPLE 1

| Ingredients | Binder (%) | Firing temp. (° C.) | Transverse breaking strength |
|---|---|---|---|
| Graphite powder + (Bentonite + Kaoline Clay) | 30 (bentonite: Kaoline = 3:2) | 1100° C. | 200 kg/cm |

EXAMPLE 2

| Ingredients | Binder (%) | Firing temp. (° C.) | Transverse breaking strength |
|---|---|---|---|
| Graphite Powder + Local Plastic clay | 30 | 1000° C. | 225 kg/cm |

EXAMPLE 3

| Ingredients | Binder (%) | Firing temp. (° C.) | Transverse breaking strength |
| --- | --- | --- | --- |
| Graphite Powder + Local Plastic Clay + Glacial Phosphoric Acid | Clay 30% Acid 10% | 400° C. | 250 kg/cm |

The main advantages of the present invention are:

1. The process is simple and does not require any special apparatus to form the final product. It essentially comprises two steps: the first being chemical cleaning of the spent pot liner to derive the micron size amorphous graphite powder, and then mixing the said graphite with a binder and firing in the temperature 400–1200° C. to arrive at the final product.
2. The process while making an industrially important material, namely pencil lead, provides a process for safe disposal and utilization of highly contaminated spent pot liners wastes of aluminum industries.
3. Ratio of the graphite powder and binder can be varied to produce a wide range of strength and blackness of various grade pencil leads.

REFERENCES

1. Pencil lead—Pilot Precision Co., Japan, Jpn Kokksi Tokkyo, Koho, JP 57, 50, 829; 29 Oct. 1982.
2. Manufacture of pencil lead—Shimoyama S. ibid, 61, 252, 278; 10 Nov. 1986.
3. Pencil lead containing graphite—Shimoyarna S. and Okabyashi, H. ibid, 03, 139, 578; 13 Jun., 1991.
4. Manufacture of pencil lead—Miyahara Y., ibid, 04, 252, 281; 8 Sep. 1982.
5. Calcined colour pencil lead with smooth writability and high mechanical strength and their manufacture—Kanba N, Echida, T. and Fujiwara, Y., ibid, 11, 286, 643; 19 Oct. 1999.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A simple and efficient process for the preparation of pencil lead from spent pot liners or a waste material of aluminum industries, said process comprising:
   a. collecting spent pot liners from an aluminum smelter plant,
   b. crushing the liners into various sizes ranging between ½ inch to about 125 micron,
   c. adding chromic acid to the crushed liners with stirring for time duration ranging between 20–40 minutes at temperature ranging between 130–140° C. to obtain the reacted product,
   d. washing the reacted product with distilled water multiple times to provide a filtrated solid mass that is neutral,
   e. drying the neutral solid mass at temperature ranging between 80° C. and 120° C. for about 1 hour to obtain dry carbon powder,
   f. thermally shock-treating the dried mass for about 1–3 minutes in a pre heated furnace kept at temperature ranging between 900–980° C. to obtain a fine flowing graphite powder,
   g. mixing the powder with one or more binders,
   h. moistening the mixture with requisite amount of water to form a stiff dough,
   i. extruding the dough under pressure to obtain product in the form of a discs,
   j. drying the discs to the moisture content of less than 10%,
   k. heating the dried discs in an inert/reducing atmosphere in a furnace at temperature ranging between 400° C. and 1200° C. for a time duration ranging between 1 and 6 hours,
   l. cooling the heated discs to room temperature in about 20–50 hours, and
   m. obtaining the pencil lead.

2. The process as claimed in claim 1, wherein the spent or waste pot liners are cathode blocks.

3. The process as claimed in claim 1, wherein the one or more binders are selected from a group consisting of bentonite clay, china clay, local plastic clay with added phosphoric acid, and kaoline clay.

4. The process as claimed in claim 1, wherein the ratio of graphite powder to binder is ranging between 4:1 to 2:3.

5. The process as claimed in claim 1, wherein the ratio of graphite powder to binder is ranging between 3:0.5 to 1:1.

6. The process as claimed in claim 1, wherein the chromic acid is added drop-wise.

7. The process as claimed in claim 1, wherein the chromic acid is added under constant stirring.

8. The process as claimed in claim 1, wherein the graphite powder is of crystalline size of about 20 micrometers.

9. The process as claimed in claims 1, wherein the graphite powder has ash content of about 15%.

10. The process as claimed in claim 1, wherein the pressure is ranging between 50–200 Kg/cm$^2$.

11. The process as claimed in claim 1, wherein the disc is dried under the shade.

12. The process as claimed in claim 1, wherein the room temperature is ranging between 24 to 30° C.

13. The process as claimed in claim 1, wherein the pencil lead obtained from said fine flowing carbon powder shows transverse breaking strength ranging between 200 to 300kg/cm.

* * * * *